United States Patent [19]

Curtis et al.

[11] Patent Number: 4,679,046
[45] Date of Patent: Jul. 7, 1987

[54] TRANSPONDER SYSTEMS

[75] Inventors: Stephen P. Curtis, High Wycombe; Gary V. Jordan, Reading, both of England

[73] Assignee: Senelco Limited, Berkshire, England

[21] Appl. No.: 810,026

[22] Filed: Dec. 17, 1985

[30] Foreign Application Priority Data

Dec. 21, 1984 [GB] United Kingdom ............... 8432562

[51] Int. Cl.[4] ...................... G01S 13/80; G08B 13/24; H01Q 7/00
[52] U.S. Cl. ...................................... 342/51; 340/572; 343/867
[58] Field of Search ............ 343/6.5 R, 6.5 SS, 6.8 R, 343/728, 742, 867; 340/572; 342/51, 44

[56] References Cited

U.S. PATENT DOCUMENTS 3,765,007 10/1973 Elder .................................... 340/572
4,260,990 4/1981 Lichtblau ............................ 343/742

FOREIGN PATENT DOCUMENTS

82/00378 2/1982 PCT Int'l Appl. ................. 340/572
1091437 11/1967 United Kingdom .
2086192 5/1982 United Kingdom .
2133660 7/1984 United Kingdom .

Primary Examiner—T. H. Tubbesing
Assistant Examiner—Gilberto Barrón, Jr.
Attorney, Agent, or Firm—Watson Cole Grindle & Watson

[57] ABSTRACT

In a transponder adapted to be attached to an object to be identified, an interrogator for interrogating the transponder utilizes an antenna system including first and second antennae with the first antenna being formed as a loop and the second antenna formed in a figure-8 configuration, and being coplanar with the first antenna. A source of power provides first and second transmission signals to the first and second antennae, respectively. A phase shift is introduced between the first and second transmission signals such that the first and second antennae create an electromagnetic interrogating field in a desired region with the electromagnetic field having a non-zero value at all points within the desired region for activating the transponder regardless of the orientation of the transponder. At least one of the two antennae may be arranged to function as a receiving antenna to receive signals emitted by the transponder.

2 Claims, 3 Drawing Figures

TRANSPONDER SYSTEMS

BACKGROUND OF THE INVENTION

FIELD OF THE INVENTION

The present invention relates to a transponder system which may be used to identify animate or inanimate objects.

Such systems operate by each animate or inanimate object carrying a transponder which responds to electromagnetic signals transmitted by a central interrogator and the transponder transmitting response signals in response to signals received by the interrogator.

A problem arises that the transponder carried by the animate or inanimate object is usually in the form of a tag and may be at any angle or disposition relative to the interrogator antennae. In certain orientations of the tag very little of the signal transmitted by the antennae will be received by the tag. To overcome this problem a system has been proposed in British Patent Specification No. 1599120 with two antennae disposed at a right angle to each other, RF power being switched to each antenna in turn. However a problem with two antennae disposed at right angles is that of siting the antennae at a convenient point. Frequently it is necessary to site the antennae on a wall by which animals or people pass. In this case it is inconvenient to have one antenna projecting from the wall. As a further example the transponder system may be used to detect vehicles with the antennae disposed beneath a roadway. In this case it is highly inconvenient to have one antenna projecting downwardly into the earth beneath the road.

SUMMARY OF THE INVENTION

The problem is avoided in accordance with the invention by providing two generally coplanar antennae in the interrogator of a transponder system, the antennae being configured so that each provides a radio freqency field at right angles to the other field in areas in which the detecting of objects is to be expected.

As preferred a first antenna is provided as a simple current loop which provides a radio frequency in a direction perpendicular to the plane of the loop. A second antenna is disposed coplanar with the first antenna in a figure-8 configuration such that the lines of force of the RF field generated by the second antenna curve between each loop of the figure-8 and at distances sufficiently far from the second antenna provide an RF field in a direction parallel with the second antenna. This is a simple and effective configuration but obviously other configurations of antennae may be envisaged, the only constraint being that the first and second antenna should be generally coplanar with one another. Since they are generally coplanar it is a simple matter to mount the antennae to a wall or in a roadway or any other position in which the antennae are to be mounted.

Power may be supplied to the first and second antennae in any suitable manner. For example RF power may be switched between the first and second antennae in a time multiplexed arrangement so that no power loss occurs between the antennae.

Alternatively power may be supplied to both antennae together. In such an arrangement a phase shift may be introduced into one antenna relative to the signal in the second antenna. If this phase shift is carefully adjusted, a field is generated which gives a good signal at the tag whatever its orientation and yet no power loss occurs between the antennae. The field in effect is circularly polarized.

BRIEF DESCRIPTION OF THE DRAWINGS

The preferred embodiment of the invention will now be described with reference to the accompanying drawings wherein.

DETAILED DESCRIPTION OF A PREFERRED EMBODIMENT

Figure 1:
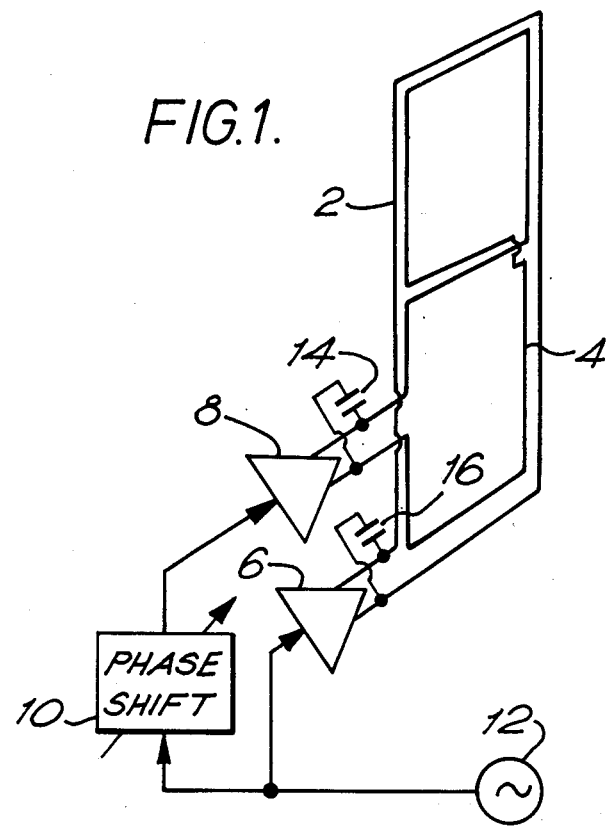
FIG. 1 is a view of the transponder system according to the invention.
Figure 2:
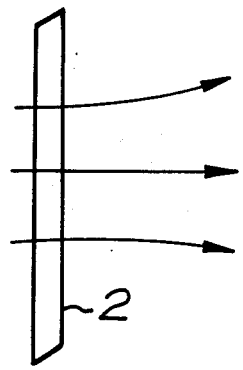
FIG. 2 is a schematic view of the field generated by a first antenna.
Figure 3:
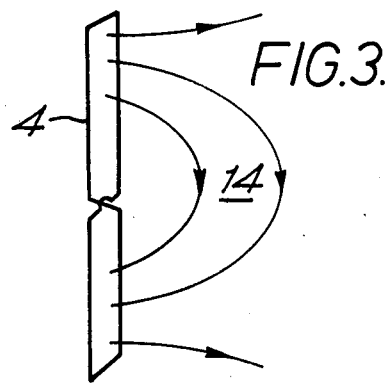
FIG. 3 is a schematic view of a field generated by a second antenna.

Referring now to the drawings two generally coplanar antennae 2, 4 are mounted on a wall, the first antenna 2 comprising a generally rectangular loop and being driven by a drive amplifier 6. A second antenna 4 comprises a figure of eight configuration and is driven by a drive amplifier 8. A phase shift which is variable is introduced at 10 into the signal to drive amplifier 8 and both drive amplifiers are driven from a signal source 12. Tuning capacitors 14, 16 are provided for the coils. As shown in FIG. 2 the field generated by the first antenna 2 is generally at right angles to the plane of the coil. As shown in FIG. 3 the field generated by the figure of eight configuration 4 comprises lines of force which curve between the two loops of the eight and in a certain region which is indicated as 14 the lines of force are generally parallel with the plane of the figure -8. Thus in this area the fields generated by the two coils are at right angles to each other. With this arrangement by careful design of the antennae it is possible to have virtually no interaction between the two coils (i.e. no power is lost directly from one coil to the other). The phase shift provides a circularly polarized field so as to ensure good interaction with a tag no matter what the orientation of the tag at all field positions.

In a specific construction, antennae 2, 4 each comprise rectangles 0.22 m wide and 0.75 m long. Each antenna comprises 3 turns of 32/0.2 stranded wire, the inductance of antenna 2 being 15.6 $\mu$B and the inductance of antenna 4 being 19.7 $\mu$H. The antennae overly one another and their thickness is 0.015 m. No housing is provided so that the antennae may be buried directly in a door or wall.

Many different antenna designs can be used to achieve the same effect and a third antenna may be added with an appropriately phase shifted signal to give a spherically polarized field. This theoretically can give complete position independence to the tag but practically will only be used in critical applications owing to the expense involved.

It will be appreciated that the antennae described above function as transmitters to generate an electromagnetic field. They may in addition function as receivers singly or in combination to receive the response signal from a tag.

We claim:

1. A transponder system, comprising:
   A transponder adapted to be attached to an object to be identified;
   an interrogator for interrogating the transponder and comprising:
   an antenna system including first and second antennae, said first antenna being formed as a loop, said second antenna being formed as a figure-of-eight configuration, and said first and second antennae being generally coplanar;

a source of electrical power for providing first and second transmission signals to said first and second antennae, respectively;

phase shift means for introducing a phase shift between said first and second transmission signals whereby said first and second antennae create an electromagnet interrogating field in a desired region, the field having a non-zero value at all points within the desired region for activating said transponder regardless of the orientation of the transponder.

2. A transponder system as claimed in claim 1, wherein at least one of said first and second antennae are arranged to function as receiving antennae to receive signals emitted by the transponder.

* * * * *